United States Patent
Wilk

(12) 
(10) Patent No.: US 6,480,268 B1
(45) Date of Patent: Nov. 12, 2002

(54) METHOD FOR TEMPORARY SUPPRESSION OF REFLECTION FOR OPTICAL MEASUREMENT

(75) Inventor: Stephen R. Wilk, Saugus, MA (US)

(73) Assignee: Optikos Corporation, Cambridge, MA (US)

(*) Notice: Subject to any disclaimer, the term of this patent is extended or adjusted under 35 U.S.C. 154(b) by 0 days.

(21) Appl. No.: 09/503,226

(22) Filed: Feb. 11, 2000

(51) Int. Cl.⁷ .................. G01M 11/00; G01B 9/00
(52) U.S. Cl. ..................................... 356/124
(58) Field of Search .................. 356/124, 124.5, 356/125, 126, 127, 239.2

(56) References Cited

U.S. PATENT DOCUMENTS

| | | | |
|---|---|---|---|
| 3,698,793 A | * 10/1972 | Tellerman | 359/290 |
| 5,280,336 A | 1/1994 | Fantone | 356/124 |
| 5,416,574 A | 5/1995 | Fantone | 356/124 |
| 5,528,026 A | * 6/1996 | Burri et al. | 250/223 B |
| 5,661,816 A | 8/1997 | Fantone et al. | 382/100 |
| 5,959,777 A | * 9/1999 | Whitehead | 359/618 |
| 5,999,307 A | * 12/1999 | Whitehead et al. | 356/298 |
| 6,147,751 A | * 11/2000 | Abitbol | 356/124 |

* cited by examiner

*Primary Examiner*—Richard A. Rosenberger
(74) *Attorney, Agent, or Firm*—Francis J. Caufield

(57) ABSTRACT

A process for measuring at least one parameter of an optical element having first and second surfaces on opposed sides thereof uses a reflection-reducing member, which is solid and has substantial mechanical integrity, but which is resilient and elastically deformable so as to conform to a surface with which it is placed in contact. This reflection-reducing member is contacted with the second surface of the optical element so that a surface of the reflection-reducing member conforms to this second surface, the parameter is measured, and the reflection-reducing member is removed from the second surface leaving this surface substantially free from any residue. The presence of the reflection-reducing member reduces or eliminates unwanted reflections from the second or "back" surface of the optical element, thus simplifying the measurement of any parameter which depends upon detecting reflection from the first or "front" surface of the optical element.

18 Claims, 1 Drawing Sheet

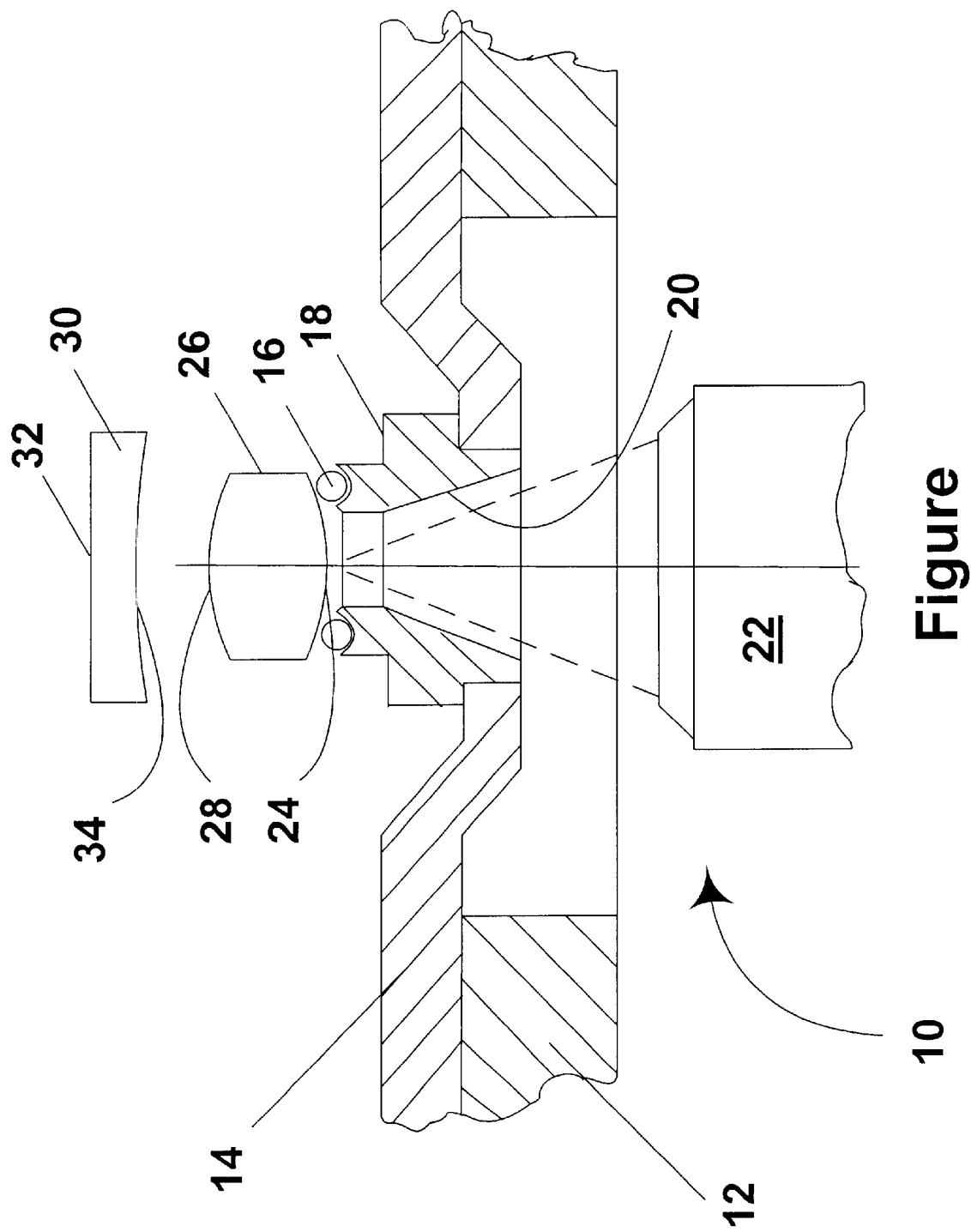
Figure

METHOD FOR TEMPORARY SUPPRESSION OF REFLECTION FOR OPTICAL MEASUREMENT

FIELD OF THE INVENTION

This invention in general relates to the field of measurement of optical elements. More specifically, this invention relates to a process for measurement of at least one parameter of an optical element which has front and back surfaces, and relates to the use of an auxiliary member to reduce reflections from the back surface of the element in order to simplify measuring the desired parameter of the front surface.

BACKGROUND OF THE INVENTION AND PRIOR ART

Throughout the process for fabricating optical systems from the simple to the more complex, it is frequently necessary to determine if, and how well, optical surfaces or elements conform to their designer's stated requirements. Not only does the performance of optical systems in final form need to be verified but various parameters of their components need to undergo intermediate testing for conformance with their specifications prior to final assembly as a system. Indeed, even the tools of fabrication, especially molds for the formation of plastic or glass lens elements, need to be tested for compliance with design specifications.

Some of the most frequently encountered measurements that need to be made are radius of curvature of surfaces in either convex or concave form, thickness, power, and various focal lengths. Classically, radii of curvature is measured through the use of a hand-held instrument called a spherometer, which measures the sagittal height (sag) of the surface over a known diameter and then displays the radius of curvature on a dial or other visual display after an internal calculation that relates radius to sag height and the known diameter. However, such devices are prone to relatively large errors because sag heights are usually small dimensions that are difficult to accurately measure mechanically.

A more accurate technique for radii measurement involves the use of an auto-collimating microscope in an arrangement referred to as a radiusscope. Here, one first focuses on the surface to be measured and then on the center of curvature of the surface where a reticle image has been formed back on itself by reflection from the test surface. The positions of the microscope are recorded, and the difference between them represents the radius of curvature to limits of accuracy which depend on the preciseness of the length measurements and the ability of the operator to accurately focus on the reference points.

Where the spherometer suffers from problems of precision, the use of the radiusscope, which can be accurate to microns if care is taken, is time consuming and dependent on operator skill and experience.

The thickness of an optical element is more or less important depending on its assigned role in a particular design and can be critical where the design relies heavily on its precision for aberration control or the like. Thickness obviously can be measured directly by mechanical means which may also be automated, but there is always the danger of damaging part surfaces with mechanical approaches.

Power and focal length are always of interest and can be calculated from classical lens makers formulae having knowledge of the various numerical values required as, for example, index of refraction, radii, and thickness.

Recently, more highly automated optical measurement systems have been developed. For example, U.S. Pat. Nos. 5,280,336; 5,416,574; and 5,661,816 (all of which are assigned to the same assignee as the present application) describe systems for the automatic and rapid measurement of parameters of optical elements. These systems are computer-controlled and, once properly programmed by an operator, can measure parameters of a large number of optical elements without further human intervention and without requiring any visual observations to be made by the operator.

Most systems for measuring parameters of optical elements, including the automated systems mentioned above, rely upon reflection of light from the surface whose parameters are being measured (hereinafter usually called the "front surface" since it is normally the surface which faces the measuring system during the parameter measurement process). In most cases, optical elements have a pair of curved optical surfaces on opposed sides of the element, as for example the two curved surfaces on opposed sides of a conventional convex lens. Thus, during the measurement process, there is disposed adjacent the measuring system not only the front surface which it is desired to measure, but also a "rear" surface on the opposed side of the optical element. Typically, this rear surface will also produce reflections which are comparable in intensity with those produced by the front surface, and can easily be confused with the front surface reflections, thus producing erroneous results. These rear surface reflections can be a particular problem in automated systems such as those mentioned above; when measurements are taken visually, an experienced operator may be able to separate the front and rear surface reflections by visual observation, but it is much less easy to separate the two series of reflections when analysis of the optical data is being effected by a computer program.

Numerous attempts have been made to eliminate rear surface reflections during optical parameter measurement processes, or at least to reduce these rear surface reflections to a point at which it is easy to distinguish them from the desired front surface reflections. One approach to the problem is to render the rear surface a dark color, for example with a colored marker such as those sold under the trade name Magic Marker. For example, applying black marker to the rear surface (the exact color is immaterial, a dark blue, green or red being equally effective) will greatly reduce the intensity of the rear surface reflections. However, such colored markers typically cannot be completely removed from the rear surface, even with the use of organic solvents, and thus leave a permanent residue (stain) on the rear surface, and the stained optical element usually cannot be sold after the testing. The resultant scrapping of the tested element greatly increases the cost of testing, and obviously renders this method useless in situations where it is desired to test all production units of an optical element.

An alternative approach to reducing rear surface reflections is to cover the rear surface with a material which has a refractive index close to that of the material on which this rear surface is formed; the covering material can be colorless so that it does not stain the optical element. As is well known to those skilled in optics, the intensity of reflections from a boundary between two different materials is a function of the difference between the refractive index of the materials which meet at the boundary, so that by making this difference small the intensity of reflections can be reduced to a point at which they will not interfere with measurements based upon the front surface reflections. For example, Rotlex Ltd, Rotem Industrial Park, D. N. Arava, Israel sells a water-soluble grease, having a consistency similar to that of petroleum jelly, as a covering material for use on optical elements. While this material does not stain the element, is does adhere tenaciously to most optical element surfaces and does not have significant mechanical cohesion, so that it must be wiped from the surface after testing is complete and may require washing of the surface with water or other solvent for complete removal.

From the foregoing, it will be seen that the prior art solutions to suppressing rear surface reflections are far from satisfactory. Furthermore, these prior art solutions are impracticable for use with automated measuring apparatus such as those described in the aforementioned patents. For example, the preferred apparatus of U.S. Pat. No. 5,416,574 is designed to carry out a measurement in approximately three seconds. If such an apparatus were used to measure the parameters of a large batch of optical elements using either a colored marker or a jelly-like material to suppress rear surface reflections, it would be difficult if not impossible to arrange for removal of the material applied to the rear surface at the throughput which the measuring apparatus is capable of achieving.

It is an object of the present invention to provide a process for measuring at least one optical parameter which enables the suppression of rear surface reflections without requiring the application of either a colored or semi-solid material to the rear surface.

It is also an object of the present invention to provide such a process in which essentially no residue is left on the optical element, so enabling the optical element to be sold commercially and thus avoiding the expense of scrapping the tested element.

It is also an object of the present invention to provide such a process which is well-adapted for use with high speed automated testing equipment in that the process does not require a lengthy step for removal of material applied to the rear surface of the optical element.

Other objects of the invention will be apparent and will appear hereinafter in the following detailed description when read in connection with the drawing.

SUMMARY OF THE INVENTION

This invention provides a process for measuring at least one parameter of an optical element having first and second surfaces on opposed sides thereof. The process of the invention uses a reflection-reducing member, this member being solid and having substantial mechanical integrity but being resilient and elastically deformable so as to enable at least one of its surfaces to conform to a surface with which it is placed in contact. In the present process, the reflection-reducing member is placed in contact with the second surface of the optical element, whereby a surface of the reflection-reducing member conforms to said second surface. At least one parameter of the first surface of the optical element is measured, and the reflection-reducing member is then removed from the second surface of the optical element leaving this second surface substantially free from any residue from the reflection-reducing member.

This invention also provides, in combination, an optical apparatus and a reflection-reducing member. The optical apparatus comprises means for supporting and positioning an optical element in a substantially fixed position on the optical apparatus with at least a second surface of the optical element exposed, and means for measuring at least one parameter of a first surface of the optical element. The reflection-reducing member is solid and has substantial mechanical integrity but is resilient and elastically deformable so as to enable at least one surface of this member to conform to a surface with which it is placed in contact.

BRIEF DESCRIPTION OF THE DRAWING

The operation of the process of the present invention, together with other objects and advantages thereof, may best be understood by reading the detailed description in connection with the accompanying drawing in which unique reference numerals have been used throughout for each part.

The sole FIGURE of the accompanying drawing is a somewhat schematic side elevation, partly in section, showing the process of the invention being used to measure parameters of an optical element (namely a convex lens) using an automated measuring apparatus as described in the aforementioned U.S. Pat. Nos. 5,280,336 and 5,416,574.

DETAILED DESCRIPTION OF THE INVENTION

As already mentioned, in the process of the present invention a reflection-reducing member is contacted with the second (i.e., rear) surface of the optical element to reduce reflections therefrom. The reflection-reducing member is solid and has substantial mechanical integrity but is resilient and elastically deformable so as to enable at least one of its surfaces to conform to the rear surface of the optical element when it is placed in contact with this rear surface.

By saying that the reflection-reducing member must have substantial mechanical integrity is meant that this member should not easily separate or break apart into fragments, so that the member can be removed from the rear surface as a single integer, thus enabling a single reflection-reducing member to be used for testing multiple optical elements. As will readily be apparent to those skilled in materials handling, the exact degree of mechanical integrity required in the reflection-reducing member may vary somewhat depending upon the exact manner in which this member is handled during the present process; in general, a reflection-reducing member intended to be handled mechanically (see the discussion below regarding possible automated forms of the present process) will require a greater minimum mechanical integrity than one intended to be handled manually.

Similarly the exact degree of resiliency and elastic deformability required in the reflection-reducing member may vary somewhat with the type of optical element being tested and the manner in which the reflection-reducing member is placed upon, and removed from, the rear surface of the optical element. It is necessary that the reflection-reducing member adhere closely to the rear surface so that no air gap is left therebetween, since even an air gap a few microns thick leaves the rear surface optically unchanged (the rear surface/air boundary still being present) and the reflections therefrom undiminished. In addition, the reflection-reducing member should accommodate itself to the rear surface so that it eliminates reflections from the whole of this surface. Furthermore, the surface of the reflection-reducing member should be smooth and free from irregularities or bubbles, since such irregularities or bubbles will result in the reflection-reducing member failing to contact certain areas of the rear surface, thus leaving these areas generating the same reflections as they would in the absence of the reflection-reducing member.

On the other hand, the reflection-reducing member should not adhere so tenaciously to the rear surface that the member acts like an adhesive or an adherent coating, and is difficult to remove from the rear surface after the measurements have been taken. Also, the reflection-reducing member should undergo true elastic deformation and not become permanently deformed, or have a long recovery time to resume its original shape after deformation. Rather the reflection-reducing member should be resilient and elastically recover its original shape rapidly after removal from the rear surface. These characteristics are important not only when the present process is carried out on high volume manufacturing lines (where the interval between removal of the reflection-reducing member from one optical element and its placement on the next element may be only one or two seconds), but also because such resilient and elastic characteristics are important in ensuring that the surface of the reflection-reducing member will stay in contact with the rear surface of the optical element throughout each measurement.

To reduce the deformation of the reflection-reducing member needed to allow it to conform to the rear surface of the optical element, the reflection-reducing member may be formed with a curved surface having substantially the same form (but of opposite curvature, e.g. if the rear surface is convex, the surface of the reflection-reducing member should be concave) as at least part of the second surface of the optical element, and this curved surface of the reflection-reducing member placed in contact with the rear surface of the optical element. Obviously, this requires a reflection-reducing member which is adapted for a specific optical element, but in practice this will not normally be a problem, since the present process will typically be carried out in a production line environment where a large number of similar optical elements are to be tested.

Obviously, from the foregoing, it will be seen that, to achieve good results from the present process, the material used to form the reflection-reducing member (hereinafter for convenience called the "RRM material") must be chosen carefully. In practice, to ensure optimum results, attention must also be paid to other properties of the RRM material. Because reflection at a boundary between two materials increases with increasing difference in refractive index between the materials, the RRM material should have a refractive index which does not differ too greatly from that of the portion of the optical member adjacent the rear surface thereof. Typically, the difference between the two refractive indices should not exceed about 0.3, and desirably this difference should not exceed about 0.15. Since in practice most optical elements are formed from a glass or synthetic resin, their refractive indices usually lie in the range of about 1.45 to about 1.65, so the refractive index of the RRM material is preferably above about 1.3, and desirably above about 1.4; most desirably the RRM material will have a refractive index in the range of about 1.4 to about 1.5. The RRM material need not be transparent or even translucent; since this material is chosen so as to leave the rear surface, after the measuring process, essentially free from any residue derived from the RRM material, a translucent or even opaque RRM material will not leave any visible stain on the optical element.

The RRM material should also be relatively lightweight, so as not to deform the optical element, since even slight distortions of the element may introduce significant errors into the measurement of optical parameters thereof. It is generally desirable that the RRM material have a specific gravity not greater than about 1.3 and preferably not greater than about 1.2. The use of a very light weight RRM material is not objectionable, since additional weighting can always be provided to ensure firm contact between the reflection-reducing member and the optical element.

Very desirably, the RRM material should be inexpensive. Because of the close contact between the reflection-reducing member and the rear surface, the reflection-reducing member will in practice inevitably pick up dust and debris from the optical elements it contacts, and will eventually have to be replaced. When the present process is used on with an automated testing apparatus having a throughput of several optical elements per minute, a number of reflection-reducing members will be used up each day, so inexpensive reflection-reducing members become a practical necessity.

Finally, in practice, the RRM material should not contain any poisonous or hazardous substances which might damage the optical element or remain as trace residues thereon, or otherwise pose a threat to operators of the process. Thus, for example, the RRM material should be free from mercury compounds, corrosive substances, radioactive substances or abrasives.

From the foregoing list of necessary and desirable properties of the reflection-reducing member, it will be seen that it is difficult to select an RRM material which meets all the requirements for optimum performance in the present process. Experimentally, it has been found that the best results are obtained using a synthetic resin gel (such gels are known commercially as "plastisols"), desirably such a gel based upon at least one vinyl monomer.

A preferred RRM material for use in the present process comprises the reaction product of a synthetic resin gel and a plasticizer. To produce such a product, desirably 5 parts by weight of Mistaflex MD19-260-1 vinyl plastisol is mixed with 8 parts by weight of Mistaflex ZJ1023 plasticizer and the resultant mixture poured into a mold (preferably a metal mold) and baked in an oven at 177° C. (350° F.) for 30–45 minutes. The resultant product is tough but very elastic and has a smooth surface with a tacky feel but leaves no residue on contact with glass or plastic, and is effective in suppressing reflections from a curved surface with which it is contacted. Mistaflex resins are manufactured, for example, by the Marchem-Dublon company, New Jersey, a division of Dash Multi-Corporation. Other suppliers of vinyl plastisols are Geon Corporation, Ohio and Cheminoics Latex and Plastisol Products at TransAmerican corporation of Ridgewood, N.J. Alternative materials include, but are not limited to, gelatin and polyvinyl alcohol (PVA).

A preferred process of the present invention will now be described in detail, though by way of illustration only, with reference to the accompanying drawing, which as mentioned above shows schematically the process of the invention being used to measure parameters of an optical element (namely a convex lens) using an automated measuring apparatus as described in the aforementioned U.S. Pat. Nos. 5,280,336 and 5,416,574, to which the reader is directed for details of the automatic measurement apparatus employed.

The portion of the measurement apparatus (generally designated 10) shown in the drawing comprises an optical head 12 on which is mounted a rotary stage 14 for receiving and supporting test optical elements in a reference plane which can be precisely rotated to measure radius of curvature and other parameters along different azimuths of the element under test. The fixed reference plane required by rotary stage 14 is defined by three nylon balls 16 (only two of which are visible in the drawing) that are precisely located in a V-shaped groove formed in a nest ring 18, which also has a tapered conical tunnel 20 that extends through to the interior of the optical head 12 and is centered about its optical axis. A microscope objective 22 is located within the optical head 12 and is coaxial with the tunnel 20. This objective 22 is provided with means for illuminating the optical element under test and for measuring reflections therefrom.

The apparatus 10 is shown in the drawing being used to measure parameters of the lower (front) surface 24 of a convex lens 26. To prevent unwanted reflections from the upper (rear) surface 28 of the lens 26, there is provided a reflection-reducing member 30, prepared from a plastisol and a plasticizer in the manner described above. The reflection-reducing member 30 is shown in its position before the present process begins, spaced from the lens 26 in order to show more clearly the form of the reflection-reducing member. From the drawing, it will be seen that the reflection-reducing member 30 has a planar upper surface 32, but that its lower surface is concave and has essentially the same form as the convex upper surface 28 of the lens 26.

To carry out the present process, the lens 26 is first placed in position on the balls 40 and then the reflection-reducing member 30 is lowered until its concave lower surface 34 contacts the upper surface 28 of the lens 26. Because of the elastic, deformable material used to form the reflection-reducing member 30, the lower surface 34 closely contacts and conforms to the upper surface 28, leaving no air gap therebetween, and thus eliminating, or at least greatly reducing, the intensity of reflections from the surface 28. The objective 22 can then carry out the measurements required to determine the desired optical parameters of the lens 26, unhindered by any significant unwanted reflections from the surface 28. When the necessary measurements have been completed, the reflection-reducing member 30 is removed from the surface 28 and the lens 26 can then be removed from the stage 14. Since removal of the reflection-reducing member 30 from the surface 28 is achieved without leaving any detectable residue on the lens 26, this lens can immediately be forwarded for further processing or packaging without the need for a cleaning operation.

It will be apparent that numerous changes and modifications can be made to the preferred process just described without departing from the scope of the invention. For example, the movement of the reflection-reducing member may be effected either manually or mechanically. In particular, when the present process is to be used with automated measuring equipment such as those described in the aforementioned patents, it may be convenient to move the reflection-reducing member mechanically, under the control of the same computer system which controls the measuring operation itself. To allow mechanical movement of the soft, flexible reflection-reducing member, this member might be mounted within a collar, or supporting members, such as wires, could project into the reflection-reducing member itself. Where the reflection-reducing member is prepared by the preferred process described above, namely by heating a mixture of a plastisol and a plasticizer within a mold, it may be desirable to place wires or other supporting members (for example, a wire or plastic grid) within the mold so that the supporting members become embedded within the reflection-reducing member, and thus provide "handles" by which the reflection-reducing member can be manipulated.

Those skilled in the art may make other changes to the invention without departing from the scope of its teachings. Therefore, it is intended that the embodiments described herein be considered as illustrative and not be construed in a limiting sense.

From the foregoing, it will be seen that the present invention provides a process which enables parameters of optical elements to be measured without interference caused by reflections from the rear surfaces of the optical elements, and without either damage to the elements or the need for a cleaning operation following the measuring process.

What is claimed is:

1. A process for measuring at least one parameter of an optical element having first and second surfaces on opposed sides thereof, said process comprising:

providing a reflection-reducing member, said member being solid and having substantial mechanical integrity but being resilient and elastically deformable so as to enable at least one surface of said member to conform to a surface with which it is placed in contact;

placing said reflection-reducing member in contact with said second surface of said optical element, whereby a surface of said reflection-reducing member conforms to said second surface;

measuring said at least one parameter of said first surface of said optical element; and removing said reflection-reducing member from said second surface of said optical element leaving said second surface substantially free from any residue from said reflection-reducing member.

2. A process according to claim 1 wherein the difference between the refractive index of said reflection-reducing member and the refractive index of the portion of said optical element adjacent the second surface thereof does not exceed about 0.3.

3. A process according to claim 2 wherein said difference between said refractive indices does not exceed about 0.15.

4. A process according to claim 1 wherein said reflection-reducing member has a refractive index of at least about 1.3.

5. A process according to claim 4 wherein said reflection-reducing member has a refractive index of at least about 1.4.

6. A process according to claim 1 wherein said reflection-reducing member comprises a synthetic resin gel.

7. A process according to claim 6 wherein said reflection-reducing member comprises a synthetic resin gel derived from at least one vinyl monomer.

8. A process according to claim 6 wherein said reflection-reducing member comprises the reaction product of a synthetic resin gel and a plasticizer.

9. A process according to claim 1 wherein said reflection-reducing member has a curved surface having substantially the same form as at least part of the second surface of the optical element, and it is this curved surface of the reflection-reducing member which is placed in contact with said second surface of said optical element.

10. A process according to claim 1 wherein said reflection-reducing member has a specific gravity of not more than about 1.3.

11. A process according to claim 10 wherein said reflection-reducing member has a specific gravity of not more than about 1.2.

12. In combination, an optical apparatus and a reflection-reducing member, said optical apparatus comprising means for supporting and positioning an optical element in a substantially fixed position on said optical apparatus with at least a second surface of said optical element exposed, and means for measuring at least one parameter of a first surface of said optical element; and said reflection-reducing member being solid and having substantial mechanical integrity but being resilient and elastically deformable so as to enable at least one surface of said member to conform to a surface with which it is placed in contact.

13. A combination according to claim 12 wherein said optical apparatus is of an automated type in which said means for measuring at least one parameter of said first surface can measure said parameter without requiring visual observation of said first surface.

14. A combination according to claim 12 wherein said reflection-reducing member has a refractive index of at least about 1.3.

15. A combination according to claim 14 wherein said reflection-reducing member has a refractive index of at least about 1.4.

16. A combination according to claim 12 wherein said reflection-reducing member comprises a synthetic resin gel.

17. A combination according to claim 16 wherein said reflection-reducing member comprises a synthetic resin gel derived from at least one vinyl monomer.

18. A combination according to claim 16 wherein said reflection-reducing member comprises the reaction product of a synthetic resin gel and a plasticizer.

* * * * *